US009619805B1

(12) United States Patent
Carr et al.

(10) Patent No.: US 9,619,805 B1
(45) Date of Patent: Apr. 11, 2017

(54) PREDICTIVE FACT GENERATION FOR QUERY OPTIMIZATION

(75) Inventors: Jacob S. Carr, Seattle, WA (US); James Hsiaosung Chuang, Issaquah, WA (US); Zachary G. Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 13/431,276

(22) Filed: Mar. 27, 2012

(51) Int. Cl.
*G06F 7/00* (2006.01)
*G06F 17/30* (2006.01)
*G06Q 30/00* (2012.01)

(52) U.S. Cl.
CPC .................................... *G06Q 30/00* (2013.01)

(58) Field of Classification Search
CPC ............... G06Q 30/02; G06Q 30/0269; G06Q 30/0601; G06Q 30/00; G06F 17/30017; G06F 12/0831; G06F 12/0862; G06F 2212/507; G06F 2212/6022; G06F 2212/6024
See application file for complete search history.

(56) References Cited

U.S. PATENT DOCUMENTS 6,002,489 A * 12/1999 Murai ................ H04N 1/00002 358/400
6,604,103 B1 * 8/2003 Wolfe
2003/0028451 A1 * 2/2003 Ananian ........... G06F 17/30867 705/26.42
2003/0158796 A1 * 8/2003 Balent ................ G06Q 30/0633 705/28
2006/0206374 A1 * 9/2006 Asthana et al. ................ 705/11
2008/0082229 A1 * 4/2008 Wingenter ...................... 701/29
2009/0281923 A1 * 11/2009 Selinger et al. ................ 705/27
2009/0313297 A1 * 12/2009 Hsu et al. ................. 707/103 R
2010/0198973 A1 * 8/2010 Jung et al. .................... 709/226
2012/0020471 A1 * 1/2012 Erhart et al. ............... 379/265.1
2013/0066646 A1 * 3/2013 Backhaus et al. ................ 705/2
2013/0218825 A1 * 8/2013 Zhang .................... G06Q 30/02 706/52

FOREIGN PATENT DOCUMENTS

WO WO 2009079153 A1 * 6/2009 ............. G06Q 30/02

* cited by examiner

*Primary Examiner* — Taelor Kim
(74) *Attorney, Agent, or Firm* — Lee & Hayes, PLLC

(57) ABSTRACT

A fact generation engine generates facts in response to fact requests submitted by clients. The fact generation engine also predictively generates additional facts prior to receiving a request for the additional facts from a client. The fact generation engine might determine whether to predictively generate additional facts based upon a determined probability that a client will request the additional facts. The estimated cost of predictively generating additional facts might also be utilized to determine whether to predictively generate the facts.

20 Claims, 8 Drawing Sheets

PREDICTIVE FACT GENERATION FOR QUERY OPTIMIZATION

BACKGROUND

Many individuals and companies operate e-commerce World Wide Web ("Web") sites. Customers and potential customers of such Web sites can browse and search for products, purchase products, read and leave reviews for products, and perform other functions. E-commerce Web sites have become one of the primary ways that consumers purchase products today.

Many different components typically operate in conjunction with one another in order to provide e-commerce Web sites. For example, many different software components may be executed in order to generate a product detail page for a product offered for sale through an e-commerce Web site. Each of the components may be responsible for generating a different portion of the product detail page.

In order to generate a portion of a product detail page, some software components might require facts about the product represented on the page. For example, one component might require facts that identify the size and the weight of the product. Another component might require facts that indicate the number of the products that are currently in stock with a merchant. Other components might require other facts about a product in order to generate their respective portions of the product detail page for the product.

Software components typically obtain facts about a product from one or more back end systems. For example, various back end systems may be utilized to maintain a product catalog containing product specifications, product inventory levels, and other facts about a product. If these back end systems are slow to respond to requests for facts, however, the software components requesting the facts can be delayed in generating their respective portions of a product detail page. Consequently, the product detail page may be delivered slowly to the device that requested the page. Slow response times can be frustrating to the users of an e-commerce Web site and may lead the users to shop at other sites. It is with respect to these and other considerations that the disclosure made herein is presented.

DETAILED DESCRIPTION

Figure 1:
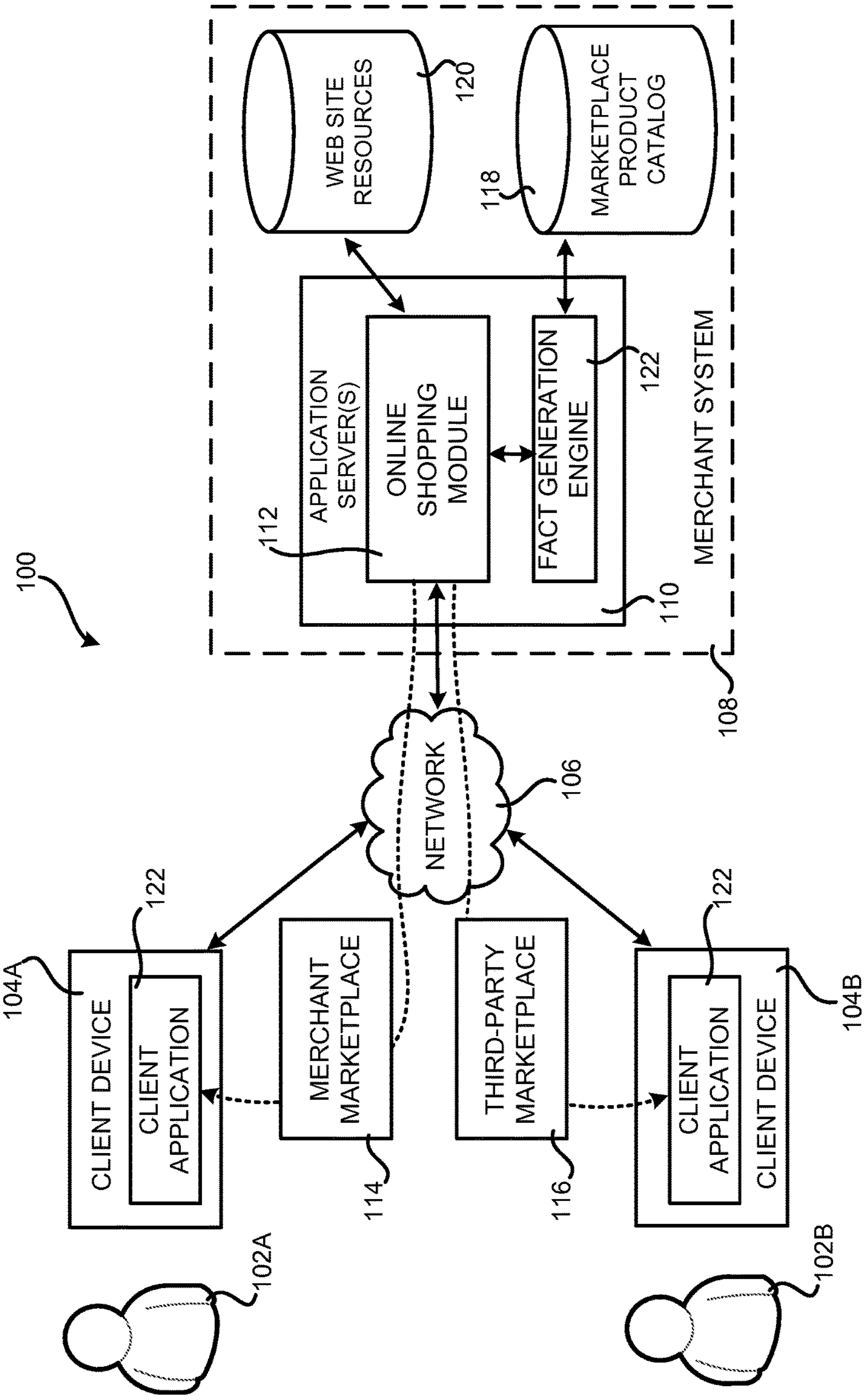
FIG. 1 is a system diagram showing an illustrative configuration for a merchant system that is configured to implement the functionality disclosed here for predictive fact generation for query optimization, according to one embodiment disclosed herein.

The following detailed description is directed to technologies for predictive fact generation for query optimization. Through an implementation of the concepts and technologies disclosed herein, a component operating within a merchant system can speculatively generate facts regarding products prior to receiving a request for the facts. The speculatively generated facts can be stored in a cache and utilized to respond to actual requests for the facts. In this way, the facts can be provided in response to fact requests more quickly than if the facts were generated following the receipt of a request for the facts.

According to one aspect disclosed herein, a merchant system includes functionality for predictively generating facts. Predictive fact generation refers to a process for generating one or more facts prior to the time a request for the facts is received. Predictive fact generation might also be referred to herein as speculative fact generation.

According to embodiments, facts predictively generated utilizing the mechanism described herein may be related to a product offered for sale through an e-commerce Web site provided by a merchant system. For example, facts may be generated relating to various attributes of a product, such as a name of a product, a description of a product, a number of a product that are in-stock, offer details such as a price for a product, and product reviews for a product. As mentioned above, however, the embodiments disclosed herein are not limited to generating facts relating to a product. Other types of facts might also be generated using the technologies disclosed herein.

According to various embodiments, a fact generation engine generates facts in response to fact requests received from components operating within the merchant system. Components that submit fact requests to the fact generation are referred to herein as "clients" of the fact generation engine. The clients may be hardware or software components executing within the merchant system, such as software components configured to generate all or a portion of product detail pages within the e-commerce Web site provided by the merchant system. The clients may utilize facts generated by the fact generation engine to generate aspects of the product detail pages or for other purposes. Other types of clients might also request and utilize facts generated by the fact generation engine in different ways.

In one embodiment, a fact request includes one or more input criterion. The input criterion identifies a product for which requested facts are to be generated. For example, the input criterion might specify a unique product identifier, such as a stock keeping unit ("SKU") number of a product, for which requested facts are to be generated. The input criterion might also identify other types of objects for which facts are to be generated. The fact request also identifies the facts requested by the client.

In response to receiving a fact request, the fact generation engine generates the facts requested in the fact request. In order to generate the requested facts, the fact generation engine might retrieve data from one or more other services, computer systems, data stores, domain tables containing facts that are not modified during runtime, network locations, or other types of data sources. For example, the fact generation engine might retrieve data from a product catalog, an inventory management system, or another system or location. The fact generation engine might also perform internal computations to generate the requested facts. It might also be necessary for the fact generation engine to generate other facts, referred to herein as "intermediate" facts, in order to generate the requested facts.

Once the fact generation engine has generated the requested facts, the fact generation engine provides a response to the requesting client that includes the requested facts. The fact generation engine might also store data identifying the facts that were requested and the actual cost of generating the facts. As utilized herein, the cost of generating a fact means the time, memory usage, storage usage, input/output bandwidth, processing capacity, network bandwidth, or other resources required to generate the fact. As will be described in detail below, historical data regarding the facts requested by a client and the estimated cost of generating the facts may be utilized to identify additional facts to be speculatively generated by the fact generation engine.

Once the fact generation engine has generated the requested facts, the fact generation engine also initiates an asynchronous process for speculatively generating additional facts. In particular, the fact generation engine determines a probability that the client will request one or more additional facts. For example, the fact generation engine might determine that the client will request one or more additional facts based upon historical data describing the fact requests previously made by the client and/or other clients. Other factors might also be utilized. The fact generation engine then speculatively generates one or more additional facts and stores the speculatively generated facts. The speculatively generated facts, for instance, might be stored in a cache, such a fact cache configured for storing the facts.

According to embodiments, the fact generation engine might also make a determination as to whether to speculatively generate additional facts based upon an estimated cost of generating the additional facts. For example, the fact generation engine might speculatively generate additional facts if the probability that the client will request the facts is high and the estimated cost of generating the facts is low. The estimated cost of speculatively generating additional facts may be determined based upon historical data that indicates the actual cost of previously generating the facts. Other factors might also be utilized to determine the estimated cost of predictively generating the additional facts.

When the fact generation engine receives a subsequent fact request for additional facts from the same client, the fact generation engine determines whether the additional facts have been speculatively generated. For example, the fact generation engine might search a fact cache to determine whether the additional facts have been previously generated and stored therein.

If the additional facts requested by the subsequent fact request have been speculatively generated, the fact generation engine returns the speculatively generated facts in response to the fact request. In this way, the fact generation engine can provide additional facts in response to a subsequent fact request received from a client more quickly than if the fact generation engine were to generate the requested facts following the receipt of a request for the additional facts from the client. Other aspects of the operation of the fact generation engine disclosed herein will be presented below with regard to FIGS. 1-7.

Although the embodiments disclosed herein are primarily presented in the context of a merchant system that embodies the concepts disclosed herein for predictive fact generation for query optimization, the disclosure presented herein is not limited to such an implementation. Rather, the embodiments disclosed herein might be utilized with any type of computer, computing system, device, Web site, application program, library, remote service, operating system, or other type of system or component. Moreover, while the embodiments presented herein are described primarily in the context of a merchant system that predictively generates facts regarding products provided through an e-commerce Web site, the embodiments disclosed herein may be used to predictively generate other types of facts. The embodiments disclosed herein, therefore, are not limited to use only with an e-commerce Web site, a merchant system, or product-related facts.

It should also be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following discussion are intended to provide a brief, general description of an illustrative operating environment 100 in which the embodiments described herein may be implemented. The environment 100 is merely illustrative and the embodiments disclosed herein might be utilized in many different types of environments.

The environment 100 includes a merchant system 108 that is configured to provide the functionality described herein for speculative generation of facts. The merchant system 100 utilizes a number of application servers 110 in one implementation. The application servers 110 may execute a number of modules in order to receive and respond to requests received from one or more client devices 104A-104B. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for providing online marketplaces. As discussed briefly above, online marketplaces are network-accessible information sites, such as e-commerce Web sites, which allow customers to browse, search, and purchase products. For instance, an online marketplace might allow customers to browse and purchase physical or digital items.

In one embodiment, the online shopping module 112 is configured to provide a merchant marketplace 114. The merchant marketplace 114 allows users, such as the user 102A in FIG. 1, to browse, search, and purchase products (which might also be referred to herein as "items") sold by the online merchant that operates the merchant system 108. For instance, the online shopping module 112 may retrieve facts regarding a particular product offered for sale by the online merchant, generate a Web page containing the facts, and transmit the page over the network 106 to the client application 122 executing on the client device 104A for display to the user 102A.

According to various implementations, the online shopping module 112 utilizes stored and/or dynamically generated resources to provide the merchant marketplace 114 and the other marketplaces described herein. Such resources might be stored in a Web site resources data store 120 and include, for instance, HTML documents like Web pages, images, text files, program code for generating Web pages, metadata, scripts, executable code, and other types of data utilized to create and/or provide a Web page.

As shown in FIG. 1, the merchant system 108 might maintain a merchant marketplace product catalog 118 that includes records for each product offered for sale through the marketplaces 114 and 116. The online shopping module 112 might utilize records in the product catalog 118 to generate product Web pages in response to requests from client devices 104. Each record may include a number of fields, such as fields storing a unique product identifier for a product, such as a stock keeping unit ("SKU") number, a name of the product, a description of the product, a number of the products that are in-stock, and offer details such as a price for the product. The merchant marketplace product catalog 118 might also be utilized to store other types of information regarding a product, such as product reviews. Virtually any suitable database technology might be utilized to implement the merchant marketplace product catalog 118 and the other data stores described herein.

According to various implementations, the online shopping module 112 also provides functionality for allowing a third-party merchant to create their own marketplace, referred to herein as a third-party marketplace 116. For instance, the online shopping module 112 might provide a user interface through which the third-party merchant can specify the products that are to be sold through the third-party marketplace 116, along with details for the products, such as a description and price of each product. This information may then be stored in the marketplace product catalog 118, or a third-party marketplace product catalog.

Once the third-party merchant has completed defining the various operational aspects of the third-party marketplace 116, the merchant system 108 can then provide the third-party marketplace 116 on behalf of the third-party merchant. For example, a user 102B utilizing a client device 104B might access the third-party marketplace 116 over the network 106 and request a Web page for a product sold by the third-party merchant. In response to receiving such a request, the online shopping module 112 will retrieve facts and other information needed to generate the requested product Web page, and return the generated Web page to the client device 104B. The user 102B might also add the product to an electronic shopping cart provided by the merchant system 108 in order to purchase the product.

If the user 102B elects to complete the purchase of the product, the merchant system 108 might provide a checkout mechanism, including payment-processing capabilities. Alternately, a third-party merchant might elect to utilize their own checkout and payment processing mechanisms. The merchant system 108 might also provide other types of functionality for implementing the third-party marketplace 116 on behalf of the third-party merchant.

As discussed briefly above, the environment 100 includes one or more users 102A-102B who use client devices 104A-104B to access the merchant system 108 through a network 106. The users 102A-102B may be individuals or entities that desire to browse, search, purchase, or have purchased, one or more products from the marketplaces 114 and/or 116. The client devices 104A-104B may be personal computers ("PC"), desktop workstations, laptop computers, tablet computers, notebook computers, personal digital assistants ("PDAs"), electronic-book readers, game consoles, set-top boxes, consumer electronics devices, server computers, or any other type of computing device capable of connecting to the network 106 and communicating with the merchant system 108. The users 102 might also be referred to herein as "visitors" to the marketplaces 114 and 116 or "customers" of the marketplaces 114 and 116.

The network 106 may be a local-area network ("LAN"), a wide-area network ("WAN"), the Internet, or any other networking topology known in the art that connects the client devices 104A-104B to the merchant system 108. As discussed above, the merchant system 108 may include a number of application servers 110 that provide various online shopping services to the client devices 104A-104B over the network 106. The users 102A-102B may use a client application 122 executing on their respective client device 104 to access and utilize the online shopping services provided by the application servers 110.

In one embodiment the client application 122 is a Web browser application, such as the MOZILLA® FIREFOX® Web browser from the MOZILLA FOUNDATION of Mountain View, Calif. The client application 122 exchanges data with the application servers 110 in the merchant system 108 using the hypertext transfer protocol ("HTTP") or another appropriate protocol over the network 106. The client application 122 might also be a stand-alone client application 122 configured for communicating with the application servers 110. The client application might also utilize any number of communication methods known in the art to communicate with the merchant system 108 and/or the application servers 110 across the network 106, including remote procedure calls, SOAP-based Web services, remote file access, proprietary client-server architectures, and the like.

As discussed briefly above, the merchant system 108 is also configured with functionality for speculative generation of facts regarding products offered for sale through the merchant system 108. In one embodiment, this functionality is implemented by a fact generation engine 122 executing on one or more of the application servers 110. The fact generation engine 122 receives and requests for facts from components operating within the merchant system 108, such as the online shopping module 112. In other embodiments, the fact generation engine 122 might provide facts to components outside the merchant system 108.

As one example, the online shopping module 112 might require facts that identify the size and the weight of a product, the number of products in stock, or other product attributes in order to generate a product detail Web page for the product. In one embodiment, the online shopping module 122 transmits a fact request to the fact generation engine 122 in order to obtain the needed facts.

In response to receiving a fact request, the fact generation engine 122 generates the requested fact, or facts, such as for instance retrieving the requested fact from the marketplace product catalog 118, and returns the requested fact in response to the fact request. The fact generation engine 122 might also speculatively generate other facts in anticipation of receiving another fact request from the online shopping module 112. Details regarding the operation of the fact generation engine 122 are provided below with regard to FIGS. 2-7.

Figure 2:
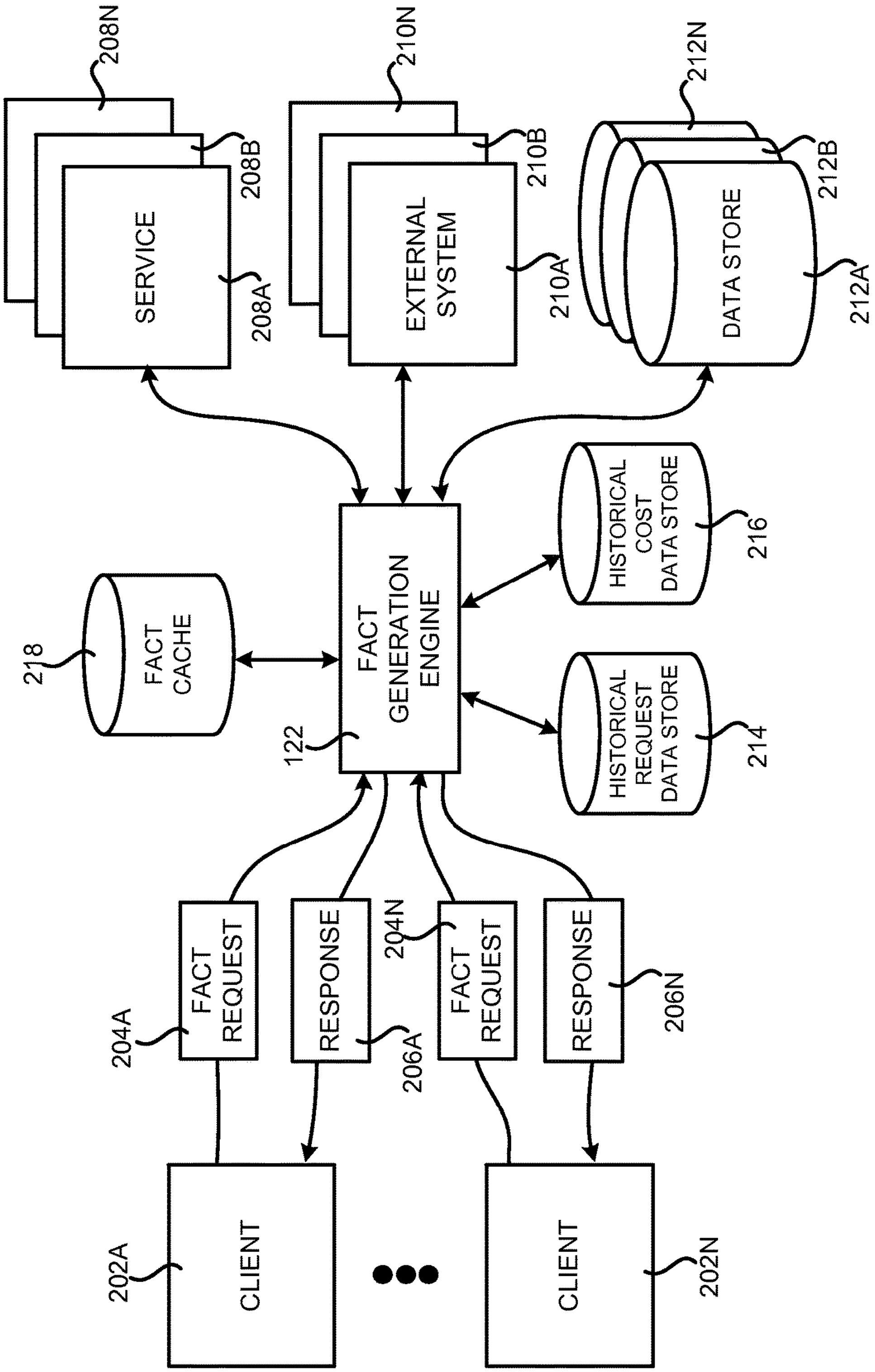
FIG. 2 is a software diagram showing one illustrative software architecture for predictively generating facts in order to optimize query processing, according to one embodiment disclosed herein.

FIG. 2 is a software diagram showing one illustrative software architecture for predictively generating facts in order to optimize query processing, according to one embodiment disclosed herein. As shown in FIG. 2 and briefly described above, a fact generation engine 122 is provided in one embodiment that receives and responds to fact requests 204A-204N (which may be referred to herein collectively as the fact requests 204 or individually as a fact request 204) from one or more clients 202A-202N (which may be referred to herein collectively as clients 202 or individually as a client 202), respectively. As mentioned above, the fact generation engine 122 might be implemented as a software module executing on one or more of the application servers 110. The fact generation engine 122 might also be implemented as hardware or as a combination of software and hardware.

The clients 202 are components that submit fact requests 204 to the fact generation 122. The clients 202 may be hardware or software components executing within the merchant system 108, such as software components like the online shopping module 112 that are configured to generate all or a portion of product detail pages within an e-commerce Web site provided by the merchant system 108. The clients 202 may utilize facts generated by the fact generation engine 122 to generate aspects of the product detail pages. Other types of clients 202 might also request and utilize facts generated by the fact generation engine 122.

In one embodiment, each fact request 204 includes one or more input criterion. The input criterion identifies a product for which requested facts are to be generated. For instance, the input criterion might specify a unique product identifier, such as the SKU number of a product, for which requested facts are to be generated. As an example, a fact request 204 may include input criterion specifying a SKU number for a product. The input criterion might also identify other types of objects for which facts are to be generated. Each fact request 204 also identifies the facts requested by the requesting client 202. A data structure utilized for the fact requests 204 in one embodiment will be described below with regard to FIG. 3A.

In response to receiving a fact request 204, the fact generation engine 122 generates the facts requested in the fact request 204. In order to generate the requested facts, the fact generation engine 122 might retrieve data from one or more other services 208A-208N, computer systems 210A-210N, data stores 212A-212N, domain tables, network locations, or other types of data sources. For example, the fact generation engine 122 might retrieve data from the product catalog 118, an inventory management system (not shown), a customer profile data store (not shown), or another system or location. The fact generation engine 122 might also perform internal computations to generate the requested facts.

Because facts might depend upon other facts, it might also be necessary for the fact generation engine 122 to generate other intermediate facts in order to generate the facts requested in a fact request 204. In this regard, fact dependency can be represented as a graph that may have cycles in it. The number of transitive dependencies (width or depth in the graph) is bound by resource requirements but not by the fact generation engine 122.

Fact generation strategies utilized by the fact generation engine 122 can be dependent upon intermediate facts. For example, an item may be assigned to a product group, such as a physical book or a digital good. Facts for digital goods may be stored in one service 208A, while facts for non-digital goods may be stored in a second service 208B. Generation of the product group fact will determine which service 208A or 208B is consulted for additional facts. Facts might also be generated in parallel, when possible.

Some facts might also make other facts irrelevant. For example, the fact generation engine 122 might be requested to generate a fact identifying a product group for a product (such as, for instance, a physical book or digital good). A requesting client 202 will specify a product and request a set of facts for the product in a fact request 204. A weight fact is relevant for a physical book, but is not relevant for a digital good, such as a digital audio file.

It should be appreciated that each fact generated by the fact generation engine 122 has an associated cost. For example, a fact requiring a remote service call would have the following costs: time due to network latency; memory for holding messages passed back and forth to the called service; central processing unit ("CPU") usage for transforming the request to/from the network and/or cache, and network bandwidth for sending and receiving data. As utilized herein, the cost of generating a fact means the time, memory usage, processing capacity, network bandwidth, or other resources required to generate a fact. However, it should be appreciated that there might also be other costs associated with the generation of a fact.

It should also be appreciated that the clients 202 transmitting fact requests 204 may have certain resource constraints. For example, displaying product information on a page of an e-commerce Web site is time sensitive. As a result, it is desirable to minimize the time required for the fact generation engine 122 to generate one or more facts in response to a fact request 204. It is also desirable to minimize the costs of fact generation.

Once the fact generation engine 122 has generated the facts requested in a fact request 204, the fact generation engine 122 provides a response 206 to the requesting client 202 that includes the requested facts. The fact generation engine 122 might also store data identifying the client 202 that requested the facts and the facts that were requested. In one embodiment, this data is stored in a historical request data store 214. The historical request data store 214 stores data that describes the probability that a request for one fact will be received following a request for another fact. This data may be derived from a record of the historical fact requests 204 submitted by clients 202.

According to embodiments, the historical request data store 214 might also include information regarding the actual use of speculatively generated facts. For example, historical data may be generated that describes the manner in which speculatively generated facts were subsequently requested, or not requested, by a calling client. This data may be utilized to determine whether certain facts should be speculatively generated in the future. For example, a certain fact may be speculatively generated periodically based upon received fact requests. If a calling client rarely requests the speculatively generated fact, then this fact may not be speculatively generated in the future. Other types of metrics relating to the efficiency of the speculative fact generation mechanism described herein may also be utilized to update the historical request data store 214.

Once the fact generation engine 122 has generated the facts requested in a fact request 204, the fact generation engine 122 might also store data describing the actual cost of generating the requested facts. In one implementation, the data describing the actual cost to generate the requested facts is stored in a historical cost data store 216. As will be described in detail below, the historical data regarding the facts requested by the clients 202 that is stored in the historical request data store 214 and the estimated cost of generating facts, as based upon the data stored in the historical cost data store 216, may be utilized to identify additional facts to be speculatively generated by the fact generation engine 122.

Once the fact generation engine 122 has generated the facts requested in a fact request 204, the fact generation engine 122 also initiates an asynchronous process for speculatively generating additional facts that may be requested by the same client 202. In particular, the fact generation engine 122 determines a probability that the client 202 will request one or more additional facts. For example, the fact generation engine 122 might determine a probability that the client 202 will request one or more additional facts based upon historical data describing the fact requests 204 previously made by the client 202 stored in the historical request data store 214. The fact generation engine 122 then speculatively generates one or more additional facts and stores the speculatively generated facts for responding to future fact requests 204.

In one embodiment, the speculatively generated facts are stored in the fact cache 218. The fact cache 218 might be utilized to cache facts other than speculatively generated facts. For example, the fact cache 218 might be pre-populated with facts prior to receiving a fact request 204. The fact cache 218 might also be populated with facts in other ways and at other times.

According to embodiments, the fact generation engine 122 might also make a determination as to whether to speculatively generate additional facts based upon an estimated cost of generating the additional facts. As an example, the fact generation engine 122 might speculatively generate additional facts if the probability that a client 202 will request the facts is high and the estimated cost of generating the facts is low. The estimated cost of speculatively generating the additional facts may be determined based upon the cost data stored in the historical cost data store 216. Other factors might also be utilized to determine the estimated cost of predictively generating additional facts in advance of a request from a client 202 for the facts.

The clients 202 may continue to request facts from the fact generation engine 122 in the same session. When the fact generation engine 122 receives a subsequent fact request 204 for additional facts from the same client 202, the fact generation engine 122 determines whether the additional facts have been speculatively generated. For example, the fact generation engine 122 might search the fact cache 218 to determine whether the additional facts have been previously generated and stored.

If the additional facts requested by the subsequent fact request 204 have been speculatively generated, the fact generation engine 122 returns the speculatively generated facts in a response 206 to the subsequent fact request 204. In this way, the fact generation engine 122 can provide additional facts in response to a subsequent fact request 204 received from a client 202 more quickly than if the fact generation engine 122 were to generate the requested facts following the receipt of a request 204 for the additional facts from the client 202. Other aspects of the operation of the fact generation engine 122 disclosed herein will be presented below with regard to FIGS. 3A-7.

Figure 3A:
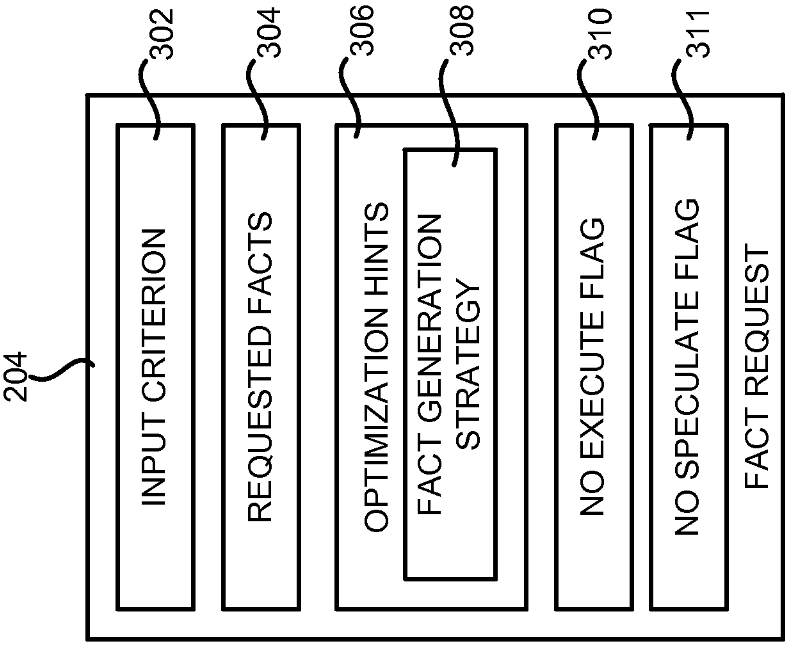
FIGS. 3A-3B are data structure diagrams showing illustrative data structures for a fact request and a response to a fact request, respectively, according to one embodiment presented herein.
Figure 3B:
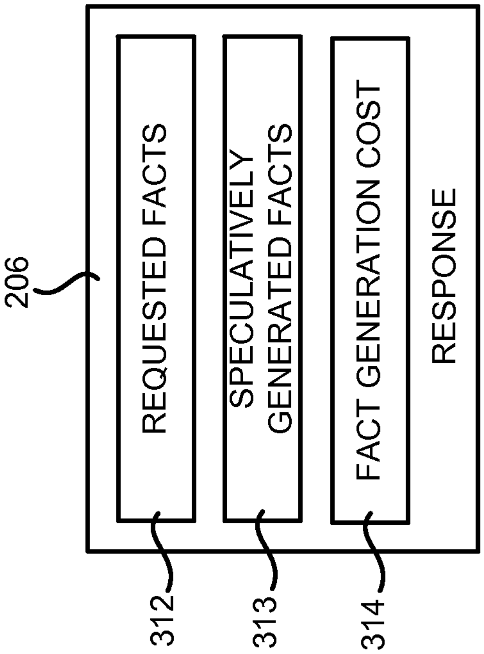

FIGS. 3A-3B are data structure diagrams showing illustrative data structures for a fact request 204 and a response 206 to a fact request 204, respectively. As illustrated in FIG. 3A, the fact request 204 utilized in one embodiment includes a field for storing the input criterion 302. As mentioned above, the input criterion identifies a product for which requested facts are to be generated in one embodiment. For example, the input criterion might specify a SKU or other type of unique identifier of a product for which requested facts are to be generated. The input criterion might also identify other types of objects for which facts are to be generated in other embodiments.

In the embodiment shown in FIG. 3A, the fact request 204 also includes a field for storing data identifying the requested facts 304. One or more requested facts 304 may be identified in a single fact request 304 from a client 202. For instance, a client 202 might request data identifying the size and weight of a product identified by the input criterion 302 in a single fact request 204. As illustrated in FIG. 3B, the values for the requested facts 304 are returned to the calling client 202 in a field 312 of the response 206 to a fact request 204.

According one implementation, a fact request 204 might also include one or more optimization hints 306. The optimization hints 306 provide instructions to the fact generation engine 122 regarding how the requesting client 202 would like the requested facts generated and returned. For instance, a client 202 might provide optimization hints 306 instructing the fact generation engine 122 to sacrifice CPU time for network bandwidth by compressing the response 206 to the fact request (for example, the HTTP Accept-Encoding header). As another example, the optimization hints 306 might specify a particular source of data that should be utilized when generating certain facts.

The optimization hints 306 might also be utilized to specify that speculatively generated facts should also be returned to the calling client in response to an initial fact request 204. In this way, requested facts and speculatively generated facts can be provided to a calling client in a single response. As shown in FIG. 3B, the values for the speculatively generated facts may be returned to the calling client 202 in a field 313 of the response 206 to a fact request 204.

In one embodiment, the optimization hints 306 are specified as one or more factors with associated weights to be used by the fact generation engine 122. For example, a client 202 might specify attributes and weights for the attributes indicating that low latency is more important to the client 202 than accuracy. In this example, the fact generation engine 122 might utilize a service 208 that has less accurate data, but that provides the data more quickly. Alternately, if the client 202 specifies that accuracy is more important than latency in the optimization hints 306, the fact generation engine 122 might utilize another service that is more accurate, but that is potentially slower. Other types of optimization hints 306 might also be specified.

In another embodiment, the optimization hints 306 might also specify a fact generation strategy 308. The fact generation strategy 308 specifies to the fact generation engine 122 a specific strategy for generating the requested facts 304. For instance, the fact generation strategy 308 might specify that one of a number ways the requested facts 304 may be generated should be utilized. As an example, the fact generation strategy 308 might instruct the fact generation engine 122 to perform tree pruning in a certain manner or to perform other specific steps when generating the requested facts 304.

The fact generation strategy 308 might also specify conditional actions to be performed by the fact generation engine 122. For instance, the fact generation strategy 308 might indicate that the fact generation engine 122 should retrieve a first fact and, if the first fact is equal to a certain value, then return another fact in response to the fact request 204. If the first fact is equal to another value, the fact generation engine 122 may be requested to return a different fact in response to the fact request 204.

As shown in FIG. 3A, a fact request 204 might also include a "no execute" flag 310 in one embodiment. The no execute flag 310 instructs the fact generation engine 122 not to generate the requested facts 304. The no execute flag 310 also instructs the fact generation engine 122 to return the estimated cost of generating the requested facts 304 in the manner specified by the optimization hints 306 and the fact generation strategy 308, if specified. In response thereto, the fact generation engine 122 determines the estimated cost of generating the requested facts 304 and returns the estimated fact generation cost 314 to the calling client 202 in the response 206 to the fact request 204. The no execute flag 310 might also specify whether the estimated cost of speculatively generating facts should also be included in the estimated fact generation cost 314.

In embodiments, a fact request 310 might also include a "no speculate" flag 311. The no speculate flag 311 may be utilized to instruct the fact generation engine 122 not to speculatively generate facts in the manner presented herein. The no speculate flag 311 might also be implemented as an optimization hint 306 or in another manner.

Figure 4A:
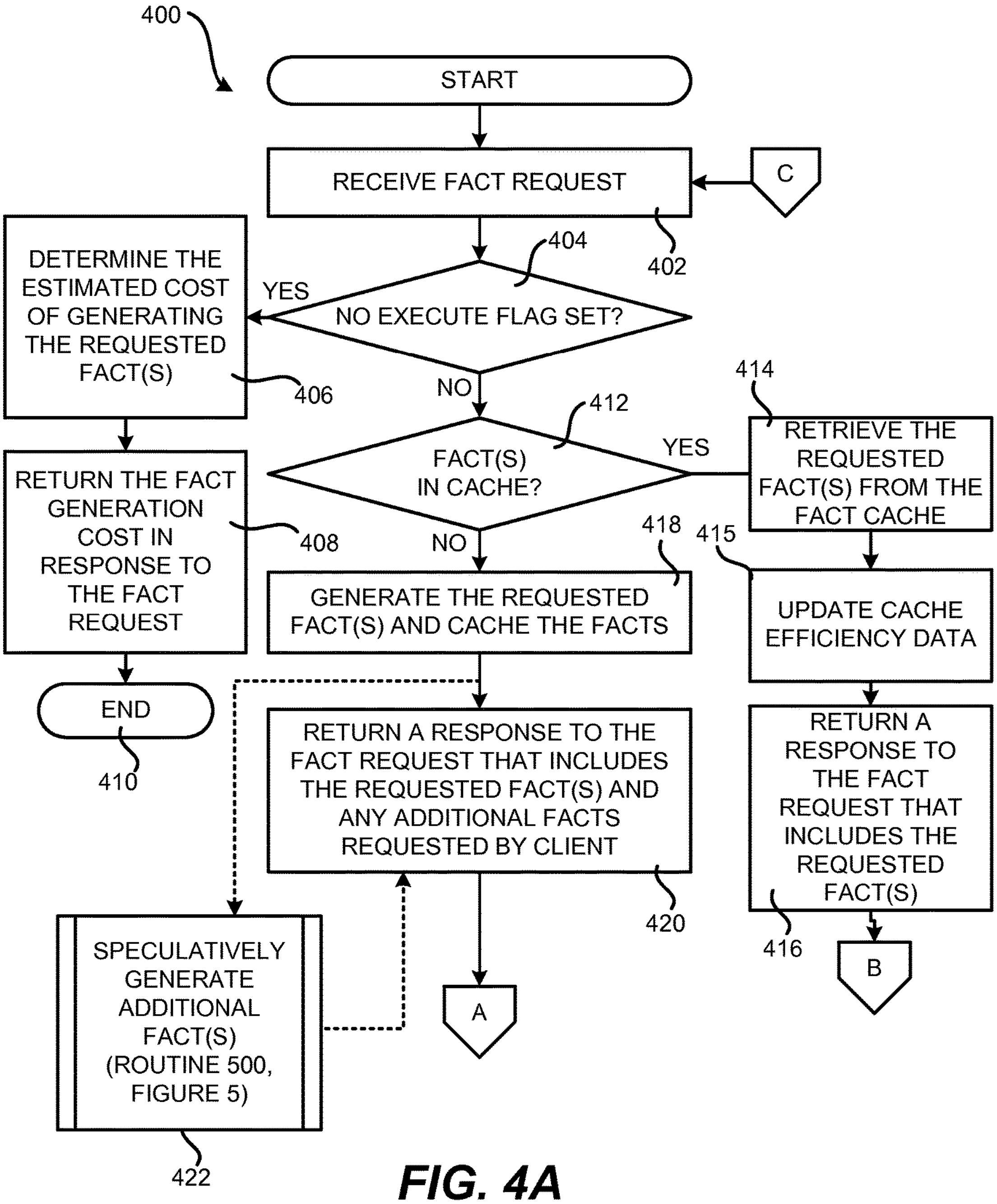
FIGS. 4A-4B are flow diagrams showing aspects of the operation of a fact generation engine, according to one embodiment disclosed herein.
Figure 4B:
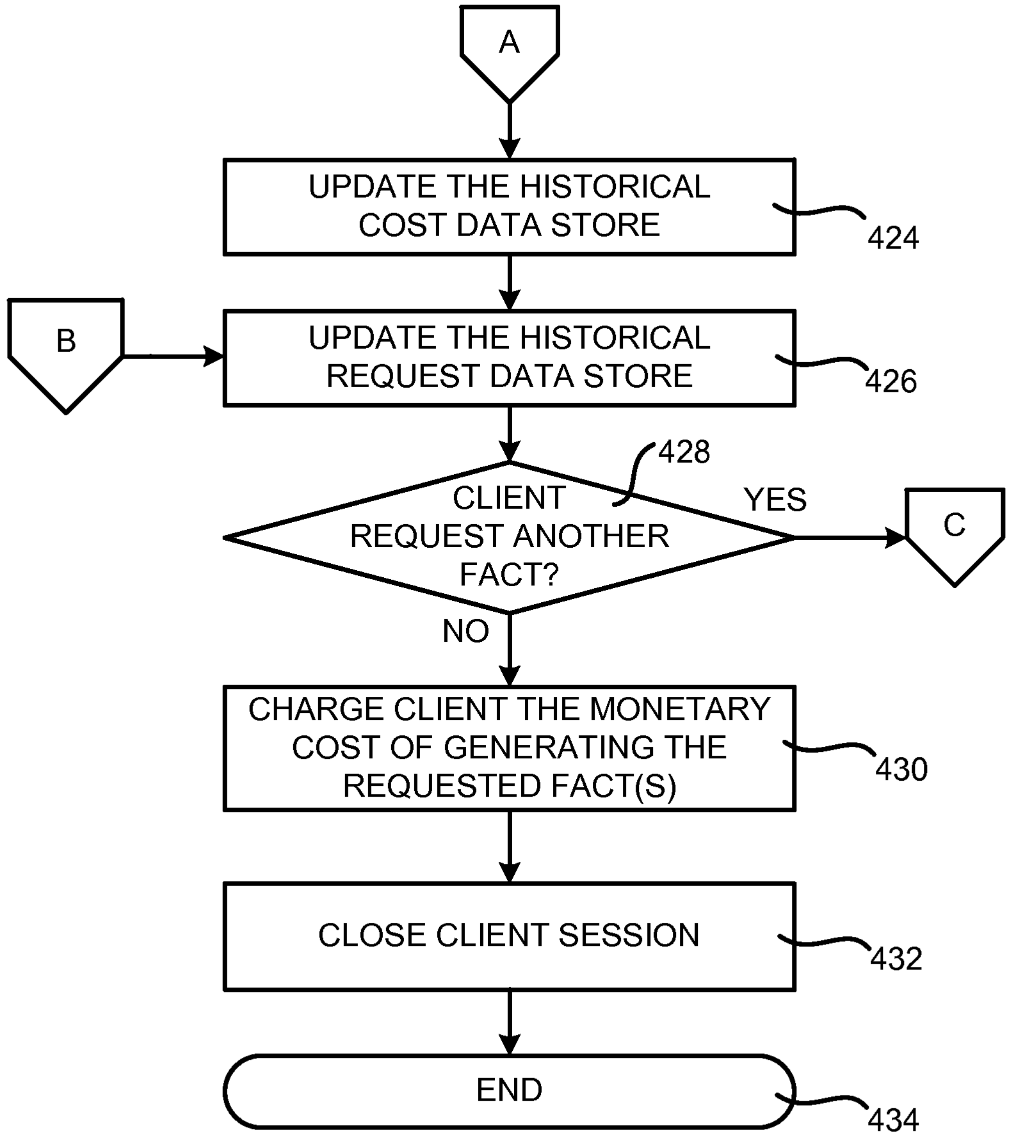

Turning now to FIGS. 4A-4B, additional details will be provided regarding the embodiments described herein for predictive fact generation for query optimization. It should be appreciated that the logical operations described herein are implemented (1) as a sequence of computer implemented acts or program modules running on a computing system and/or (2) as interconnected machine logic circuits or circuit modules within the computing system.

The implementation of the logical operations described herein is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in parallel, or in a different order than described herein.

FIGS. 4A-4B are flow diagrams showing one routine 400 that illustrates aspects of the operation of a fact generation engine 122 in one embodiment disclosed herein. The routine 400 begins at operation 402, where the fact generation engine 122 receives a fact request 204 from one of the clients 202A-202N. In response to receiving a fact request 204, the routine 400 proceeds to operation 404, where the fact generation engine 122 determines whether the no execute flag 310 has been set in the received fact request 204. If the no execute flag 310 has been set in the fact request 204, the routine 400 proceeds from operation 404 to operation 406.

At operation 406, the fact generation engine 122 determines the estimated cost of generating the requested facts 304 in the received fact request 204. As mentioned above, the estimated cost may be determined using the historical cost data stored in the historical cost data store 216. Other mechanisms might also be utilized to determine the estimated cost of generating the requested facts 304. Additionally, the optimization hints 306 and fact generation strategy 308 specified in the fact request 204, if any, might also be taken into account when generating the expected cost.

From operation 406, the routine 400 proceeds to operation 408, where the fact generation engine 122 returns the estimated fact generation cost 314 to the calling client 202 in the response 206. The routine 400 then proceeds from operation 408 to operation 410, where it ends.

If, at operation 404, the fact generation engine 122 determines that the no execute flag 310 has not been set in the fact request 204 received at operation 402, the routine 400 proceed from operation 404 to operation 412. At operation 412, the fact generation engine 122 determines whether the requested facts 304 are stored in the fact cache 218. If the requested facts 304 are stored in the fact cache 218, the routine 400 proceeds from operation 412 to operation 414.

At operation 414, the fact generation engine 122 retrieves the requested facts from the fact cache 218. The routine 400 then proceeds to operation 415, where the cache efficiency data stored in the historical request data store 214 is updated. As mentioned above, the historical request data store 214 might also include information regarding the actual use of speculatively generated facts. This data may be utilized to determine whether certain facts should be speculatively generated in the future.

From operation 415, the routine 400 proceeds to operation 416, where the fact generation engine returns a response 312 to the calling client 202 that includes the requested facts that were generated previously. In this way, the fact generation engine 122 can respond to a fact request 204 without having to generate the requested facts 204. From operation 416, the routine 400 proceeds to operation 426, which is described below.

If, at operation 412, the fact generation engine 122 determines that the requested facts 304 are not stored in the fact cache 218, the routine 400 proceeds from operation 412 to operation 418. At operation 418, the fact generation engine 122 generates the requested facts 304 in the manner described above and stores the generated facts in the fact cache 218. When generating the requested facts, the fact generation engine 122 may utilize the optimization hints 306 and/or the fact generation strategy 308 provided in the fact request 204, if any. Once the requested facts 304 have been generated, the routine 400 proceeds to operation 420.

Following operation 418, the fact generation engine 122 may also begin execution of a parallel process for speculatively generating additional facts in anticipation of receiving another fact request 202 from the client. Details regarding one illustrative routine 500 for speculatively generating additional facts will be provided below with regard to FIG. 5.

At operation 420, the fact generation engine 122 returns a response 206 to the calling client 202 that includes the requested facts. If the calling client 202 has requested that additional speculatively generated facts be included in the response 206 to the fact request, these facts 313 might also be returned to the calling client 202 in the response 206 at operation 420. From operation 420, the routine 400 proceeds to operation 422, where the fact generation engine 122 updates the historical cost data store 216 to reflect the actual cost of generating the requested facts 304 at operation 418. The routine 400 then proceeds to operation 426, where the fact generation engine 122 updates the historical request data store 214 to reflect the facts that were requested in the received fact request 204. From operation 426, the routine 400 proceeds to operation 428.

At operation 428, the fact generation engine 122 determines whether the client 202 that submitted the fact request 204 received at operation 402 has submitted another fact request. If so, the routine 400 proceeds from operation 428 to operation 402, described above, where the fact request 204 is processed in the manner described above. If the client 202 that submitted the fact request 204 received at operation 402 has not submitted another fact request 204, the routine 400 proceeds from operation 428 to operation 430.

At operation 430, the fact generation engine 122 performs processing operations so that the client that submitted the fact requests 204 can be charged for the actual monetary costs of generating the requested facts 304. For example, data may be recorded at operation 430 so that the monetary cost of compute capacity for fact generation and/or the monetary cost for remote service calls and previously computed facts can be passed along to a calling client 202. In the case of clients 202 that are operating within the merchant system 108 this might be performed as an internal accounting charge to a department or entity that operates the calling client 202. It should be appreciated, however, that the clients 202 might not be charged the monetary cost of generating facts in other embodiments.

From operation 430, the routine 400 proceeds to operation 432, where the session with the calling client 202 is closed. The routine 400 then proceeds to operation 434, where it ends.

Figure 5:
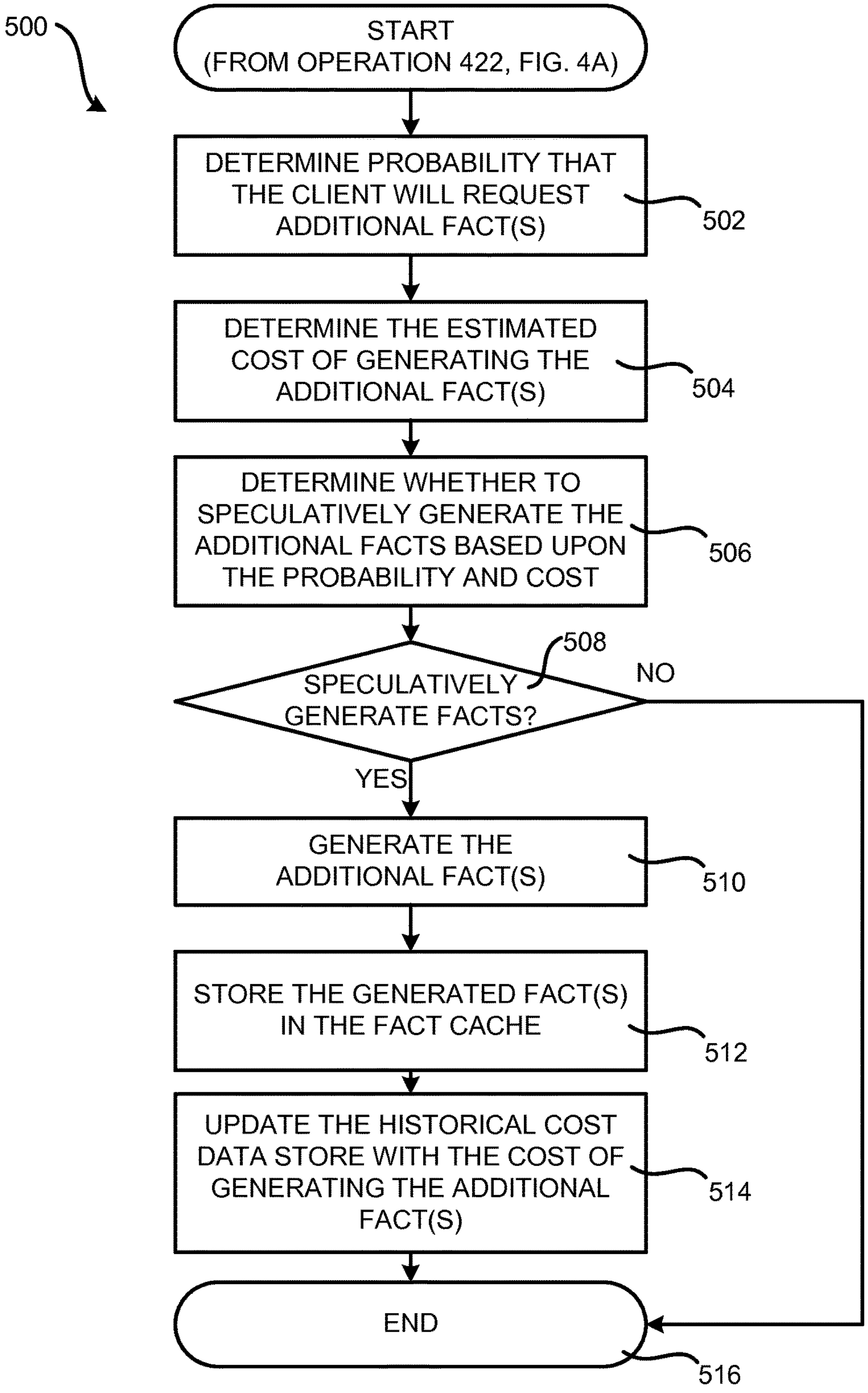
FIG. 5 is a flow diagram showing additional aspects of the operation of the fact generation engine, according to one embodiment disclosed herein.

FIG. 5 is a flow diagram showing a routine 500 that illustrates additional aspects of the operation of the fact generation engine 122 in one embodiment disclosed herein. In particular, the routine 500 illustrates operations performed by the fact generation engine 122 in one embodiment for speculatively generating additional facts following the receipt of a fact request 204.

The routine 500 begins at operation 502, where the fact generation engine 122 estimates the probability that the client 202 that submitted the fact request 204 at operation 402 will request additional facts. As mentioned above, this determination may be made based upon various factors such as data stored in the historical request data store 214, the identity of the calling client 202, facts requested and/or generated earlier in the session with the client, the optimization hints 306, the fact generation strategy 308, and potentially other factors. Once the fact generation engine 122 has determined the probability of additional fact requests 304, the routine 500 proceeds to operation 504.

At operation 504, the fact generation engine 122 determines the estimated cost of generating the additional facts identified at operation 502. As mentioned above, the cost of generating the additional facts might be determined based upon: the contents of the historical cost data store 216; methods invoked and inputs to the methods; other facts generated previously computed in the session; the cost for remote service calls, intermediate processing or fact generation; sending, receiving, and transforming data received from remote service calls; and potentially other factors. The routine 500 then proceeds from operation 504 to operation 506.

At operation 506, the fact generation engine 122 determines whether to speculatively generate additional facts based upon the probability determined at operation 502 and the cost of generating the facts determined at operation 504. For example, the fact generation engine 122 might speculatively generate a fact even if the probability that the fact will be requested is high even if the generation cost is also high. If the probability that the fact will be requested is low, the fact generation engine 122 might still speculatively generate the requested fact if the generation cost is also low. An administrator of the fact generation engine 122 might specify the relationship between request probabilities and generation costs that result in the speculative generation of a fact.

If the fact generation engine 122 determines that no additional facts are to be speculatively generated, the routine 500 proceeds from operation 508 to operation 516, where it ends. If, however, additional facts are to be speculatively generated, the routine 500 proceeds from operation 508 to operation 510.

At operation 510, the fact generation engine 122 generates the additional facts in the manner described above with regard to operation 418. The routine 500 then proceeds from operation 510 to operation 512, where the fact generation engine 122 stores the speculatively generated facts in the fact cache 218 or in another location for use in responding to future fact requests 204. The routine 500 then proceeds to operation 514, where the fact generation engine 122 updates the historical cost data store 216 with the actual costs of speculatively generating the additional facts at operation 510. The routine 500 then proceeds from operation 514 to operation 516, where it ends.

Figure 6:
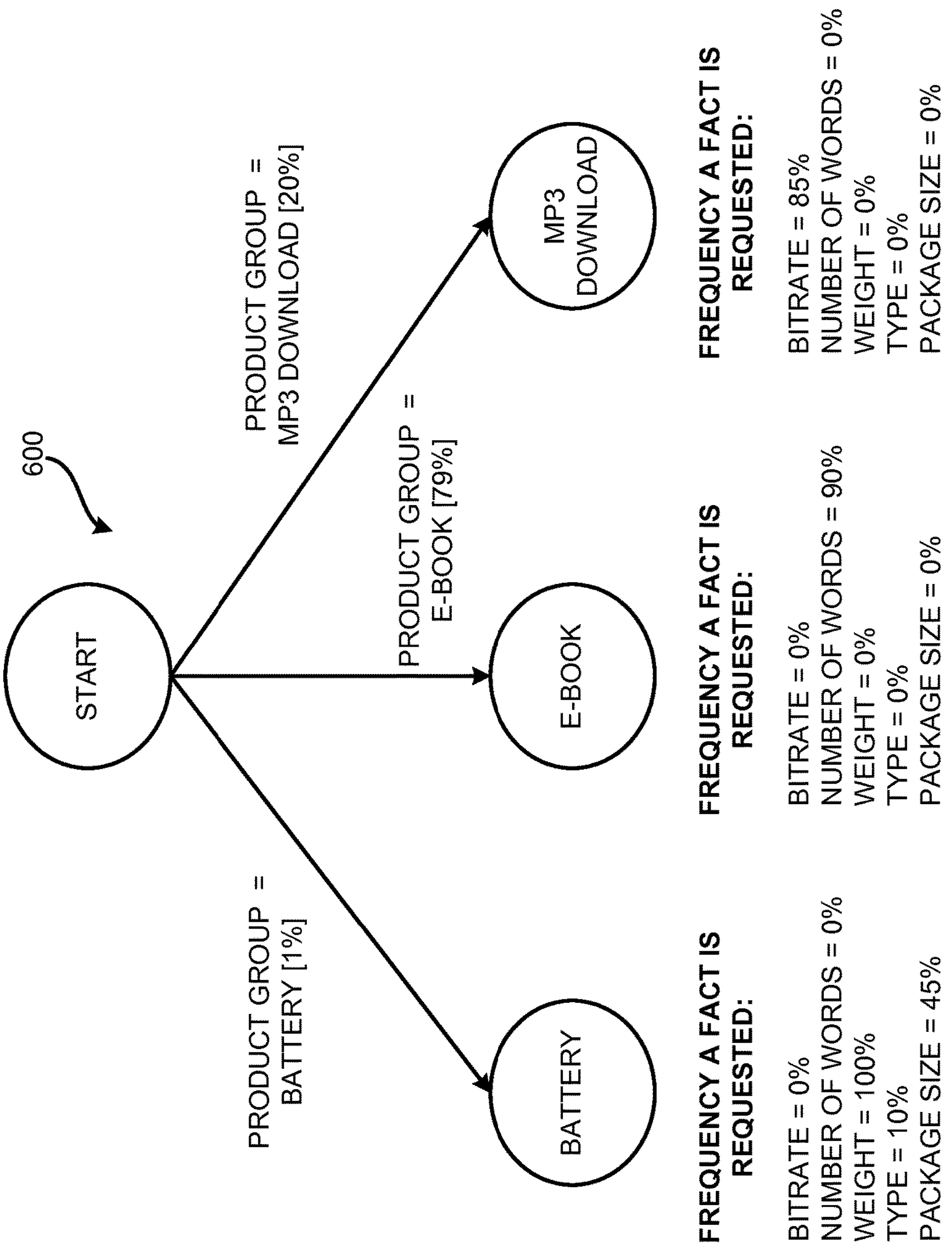
FIG. 6 is a sample confidence decision tree illustrating aspects of the operation of the fact generation engine, in one illustrative embodiment disclosed herein.

FIG. 6 is a confidence decision tree 600 illustrating additional aspects of the operation of the fact generation engine 122 in one illustrative embodiment disclosed herein. In the example shown in FIG. 6, a sample confidence decision tree 600 is presented. Such a decision tree might be utilized by the face generation engine 122 in embodiments to determine whether to speculatively generate additional facts.

In the simplified example shown in FIG. 6, one percent of fact requests are for batteries, 79 percent of the fact requests are for e-books, and 20 percent of the fact requests received by the fact generation engine 122 are for mp3 downloads. In this example, a fact identifying the product group (i.e. battery, e-book, or mp3 download) is a prerequisite to generating any other facts. As a result, the fact generation engine 122 will automatically generate the product group fact in this example.

In the example shown in FIG. 6, the fact generation engine 122 may or may not speculatively generate the following facts based upon the computed generation cost and the specified frequency: weight (requested 100% of the time when the product group is battery); type (requested 10% of the time when the product group is battery); package size (requested 45% of the time when the product group is battery); number of words (requested 90% of the time when the product group is e-book); and bitrate (requested 85% of the time when the product group is mp3 download). It should be appreciated, however, that the confidence decision tree 600 shown in FIG. 6 has been simplified for discussion herein and that the fact generation engine 122 might utilize significantly more complex data structures in order to identify facts for speculative generation.

Figure 7:
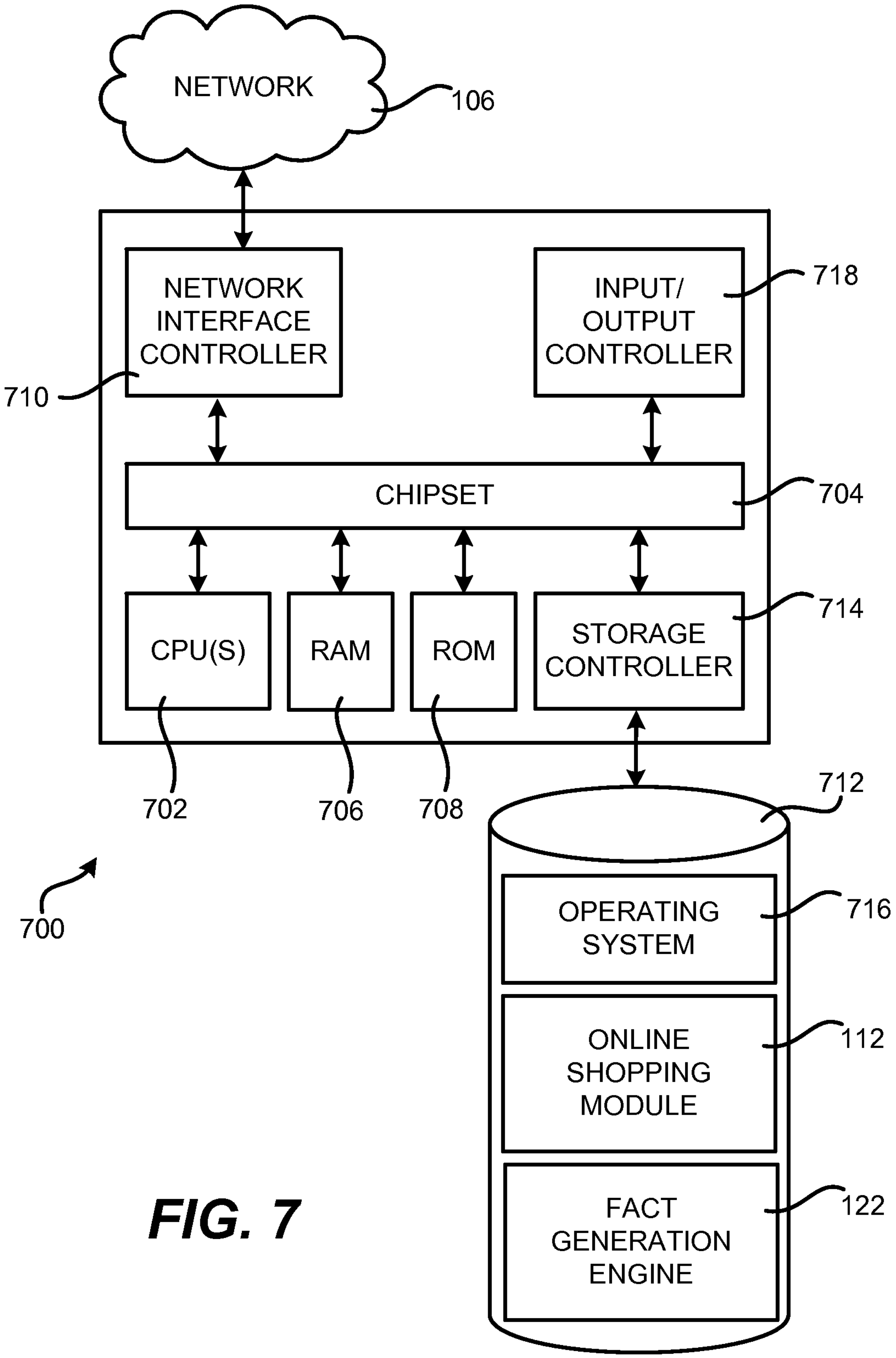
FIG. 7 is a computer architecture diagram showing one illustrative computer hardware architecture for use in computing devices configured to implement the concepts and technologies disclosed herein in one embodiment.

FIG. 7 shows an example computer architecture for a computer 700 capable of executing the software components described herein for predictive fact generation for query optimization. The computer architecture 700 shown in FIG. 7 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the client devices 104, or other computing platform.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 704. The CPUs 702 are standard programmable processors that perform arithmetic and logical operations necessary for the operation of the computer 700.

The CPUs 702 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 704 provides an interface between the CPUs 702 and the remainder of the components and devices on the baseboard. The chipset 704 may provide an interface to a random access memory ("RAM") 706, used as the main memory in the computer 700. The chipset 704 may further provide an interface to a computer-readable storage medium such as a read-only memory ("ROM") 708 or non-volatile RAM ("NVRAM") for storing basic routines that that help to startup the computer 700 and to transfer information between the various components and devices. The ROM 708 or NVRAM may also store other software components necessary for the operation of the computer 700 in accordance with the embodiments described herein.

According to various embodiments, the computer 700 may operate in a networked environment using logical connections to remote computing devices and computer systems through a network, such as a local-area network ("LAN"), a wide-area network ("WAN"), the Internet, or any other networking topology known in the art that connects the computer 700 to remote computers. The chipset 704 includes functionality for providing network connectivity through a network interface controller ("NIC") 710, such as a gigabit Ethernet adapter.

For example, the NIC 710 may be capable of connecting the computer 700 to other computing devices, such as the application servers 110, the client devices 104, a data storage system in the merchant system 108, and the like, over the network 106 described above in regard to FIG. 1. It should be appreciated that multiple NICs 710 may be present in the computer 700, connecting the computer to other types of networks and remote computer systems.

The computer 700 may be connected to a mass storage device 712 that provides non-volatile storage for the computer. The mass storage device 712 may store system programs, application programs, other program modules, and data, which have been described in greater detail herein. The mass storage device 712 may be connected to the computer 700 through a storage controller 714 connected to the chipset 704. The mass storage device 712 may consist of one or more physical storage units. The storage controller 714 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage, or the like.

For example, the computer 700 may store information to the mass storage device 712 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 712 by detecting the physical states or characteristics of one or more particular locations within the physical storage units.

In addition to the mass storage device 712 described above, the computer 700 might have access to other computer-readable media to store and retrieve information, such as program modules, data structures, or other data. It should be appreciated by those skilled in the art that computer-readable media can be any available media that may be accessed by the computer 700, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 712 may store an operating system 716 utilized to control the operation of the computer 700. According to one embodiment, the operating system comprises the LINUX operating system. According to another embodiment, the operating system comprises the WINDOWS® SERVER operating system from MICRO- SOFT Corporation of Redmond, Wash. According to further embodiments, the operating system may comprise the UNIX or SOLARIS operating systems. It should be appreciated that other operating systems may also be utilized.

The mass storage device 712 might also store other system or application programs and data utilized by the computer 700. For instance, when utilized to implement one or more of the client devices 104A-B, the mass storage device 712 may store the client application 122. When utilized to implement one or more of the application servers 110, the mass storage device may store the online shopping module 112 and/or the fact generation engine 122. The mass storage device 712 might also store other programs and data for use in implementing the various embodiments disclosed herein.

In one embodiment, the mass storage device 712 or other computer-readable storage media may be encoded with computer-executable instructions that, when loaded into the computer 700, transform the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 has access to computer-readable storage media storing computer-executable instructions that, when executed by the computer, perform the various routines and operations described herein.

The computer 700 may also include an input/output controller 718 for receiving and processing input from a number of input devices, such as a keyboard, a mouse, a touchpad, a touch screen, an electronic stylus, or other type of input device. Similarly, the input/output controller 718 may provide output to a display device, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for predictively generating facts for query optimization have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for query optimization, the computer-implemented method comprising executing instructions in a computer system to perform the operations of:

receiving a request for a fact regarding a product offered for purchase in a product catalog from a client, wherein receiving the request for a fact includes receiving a product identifier associated with the product offered for purchase;

in response to receiving the request for the fact regarding the product offered for purchase in the product catalog from the client, generating the fact regarding the product offered for purchase in the product catalog and returning the fact regarding the product offered for purchase in the product catalog to the client in response to the request;

determining a probability that the client will request one or more additional facts regarding the product offered for purchase in the product catalog, wherein the probability that the client will request the one or more additional facts is determined at least in part on historical requests data describing a probability that the one or more additional facts will be requested following a request for the fact;

determining an estimated cost of generating the one or more additional facts regarding the product offered for purchase in the product catalog, wherein the estimated cost is determined at least in part based upon historical cost data describing an actual historical cost to generate the one or more additional facts, the estimated cost comprising one or more of an estimated time, memory usage, processing capacity, or network bandwidth required to generate the one or more additional facts;

speculatively generating the one or more additional facts regarding the product offered for purchase in the product catalog based upon the determined probability and the estimated cost of generating the one or more additional facts regarding the product offered for purchase in the product catalog;

storing the speculatively generated one or more additional facts regarding the product offered for purchase in the product catalog for use in responding to a future fact request regarding the product offered for purchase in the product catalog from the client;

updating the historical cost data with an actual cost to generate the one or more additional facts;

receiving a request from the client for the one or more additional facts; and responding to the request for the one or more additional facts with the one or more additional facts.

2. A non-transitory computer-readable storage medium having computer-executable instructions stored thereupon which, when executed by the computer, cause the computer to:

receive a fact request identifying one or more requested facts regarding an item identified in a product catalog, wherein receiving the fact request includes receiving a product identifier associated with the item identified in the product catalog;

in response to receiving the fact request, generate the one or more requested facts regarding the item identified in the product catalog, and to respond to the fact request with the one or more requested facts regarding the item identified in the product catalog;

determine, based at least in part upon historical fact requests, a probability that one or more additional facts regarding the item identified in the product catalog will be requested following the fact request;

determine, based at least in part upon historical cost data, an estimated cost of generating the one or more additional facts, the estimated cost comprising one or more of an estimated time, memory usage, processing capacity, or network bandwidth required to generate the one or more additional facts;

generate, based at least in part upon the determined probability being higher than a threshold amount and the estimated cost being lower than a threshold amount, the one or more additional facts regarding the item identified in the product catalog;

store the one or more additional facts for use in responding to a future fact request regarding the item offered for purchase; and receive a request for the one or more additional facts; and respond to the request for the one or more additional facts with the one or more additional facts.

3. The computer-readable storage medium of claim 2, having further computer-executable instructions stored thereupon which, when executed by the computer, cause the computer to respond to the fact request with the one or more additional facts regarding the item identified in the product catalog.

4. The computer-readable storage medium of claim 2, wherein the fact request further comprises one or more optimization hints comprising preferences regarding how the one or more requested facts regarding the item identified in the product catalog should be generated, and wherein generating the one or more requested facts regarding the item identified in the product catalog comprises generating the one or more requested facts regarding the item identified in the product catalog using the optimization hints provided in the fact request.

5. The computer-readable storage medium of claim 2, wherein the fact request further comprises a no execute flag, and wherein the computer-readable storage medium has further computer-executable instructions stored thereupon which, when executed by the computer, cause the computer to provide a response to the fact request comprising an estimated cost to generate the one or more requested facts regarding the item identified in the product catalog.

6. An apparatus for optimized generation of facts, the apparatus comprising:

at least one processor; and a computer-readable storage medium having computer-executable instructions stored thereon which, when executed on the at least one processor, cause the apparatus to:

receive a request for one or more facts regarding an item identified in a product catalog, the request including a product identifier associated with the item identified in the product catalog, determine, based at least in part upon historical request data, a probability that one or more additional facts regarding the item identified in the product catalog will be requested following the request for the one or more facts;

determine, based at least in part upon historical cost data, an estimated cost for generating the one or more additional facts, the estimated cost comprising one or more of an estimated time, memory usage, processing capacity, or network bandwidth required to generate the one or more additional facts;

speculatively generate the one or more additional facts regarding the item identified in the product catalog based upon the probability that the one or more additional facts regarding the item identified in the product catalog will be requested; and update the historical cost data with an actual cost to generate the one or more additional facts.

7. The apparatus of claim 6, wherein the computer-readable storage medium has further computer-executable instructions stored thereon which, when executed on the at least one processor, cause the apparatus to speculatively generate the one or more additional facts regarding the item identified in the product catalog based upon the computed probability that the one or more additional facts regarding the item identified in the product catalog will be requested following the request for the one or more facts regarding the item identified in the product catalog and an estimated cost of generating the one or more additional facts regarding the item identified in the product catalog.

8. The apparatus of claim 6, wherein the computer-readable storage medium has further computer-executable instructions stored thereon which, when executed on the at least one processor, cause the apparatus to:

store the speculatively generated one or more additional facts regarding the item identified in the product catalog in a fact cache;

receive a request for the one or more additional facts regarding the item identified in the product catalog subsequent to the request for the one or more facts regarding the item identified in the product catalog; and respond to the request for the one or more additional facts regarding the item identified in the product catalog with the one or more additional facts regarding the item identified in the product catalog stored in the fact cache.

9. The apparatus of claim 8, wherein the request for the one or more facts regarding the item identified in the product catalog further comprises one or more optimization hints comprising preferences regarding how the one or more facts regarding the item identified in the product catalog are to be generated, and wherein the computer-readable storage medium has further computer-executable instructions stored thereon which, when executed on the at least one processor, cause the apparatus to generate the one or more facts regarding the item identified in the product catalog using the optimization hints provided in the fact request.

10. The apparatus of claim 9, wherein the request for the one or more facts regarding the item identified in the product catalog further comprises a no execute flag, and wherein the computer-readable storage medium has further computer-executable instructions stored thereon which, when executed on the at least one processor, cause the apparatus to provide a response to the request for the one or more facts regarding the item identified in the product catalog comprising an estimated cost to generate the one or more facts regarding the item identified in the product catalog.

11. The computer-implemented method as in claim 1, further comprising storing the one or more additional facts in a fact cache.

12. The computer-implemented method as in claim 1, wherein the request for the one or more additional facts further comprises one or more optimization hints comprising preferences regarding how the one or more additional facts are to be generated.

13. The computer-implemented method as in claim 1, wherein the request for the one or more additional facts comprises a no execute flag.

14. The computer-implemented method as in claim 1, wherein responding to the request for the one or more additional facts comprises providing the estimated cost of generating the one or more additional facts regarding the product offered for purchase in the product catalog.

15. The computer-implemented method as in claim 1, wherein one of the one or more additional facts comprises a number of the product offered for purchase in the product catalog that are currently in stock by a merchant.

16. The computer-implemented method as in claim 1 wherein the speculatively generating the one or more additional facts, is based at least in part, upon a determination that the estimated cost of generating the one or more additional facts is below a threshold.

17. The non-transitory computer-readable storage medium as in claim 2, having further computer-executable instructions stored thereupon which, when executed by the computer, cause the computer to store the one or more additional facts in a fact cache.

18. The non-transitory computer-readable storage medium as in claim 2, having further computer-executable instructions stored thereupon which, when executed by the computer, cause the computer to determine a number of the item identified in a product catalog that are available for purchase.

19. The apparatus of claim 6, wherein the computer-readable storage medium has further computer-executable instructions stored thereon which, when executed on the at least one processor, cause the apparatus to determine a number of the item identified in the product catalog that are available for purchase.

20. The apparatus of claim 6, wherein the one or more additional facts regarding the item identified in the product catalog are speculatively generated based upon the estimated cost for generating the one or more additional facts.

* * * * *